(12) United States Patent
Takahashi

(10) Patent No.: US 11,196,914 B2
(45) Date of Patent: Dec. 7, 2021

(54) APPARATUS, METHOD, AND RECORDING MEDIUM

(71) Applicant: CANON KABUSHIKI KAISHA, Tokyo (JP)

(72) Inventor: Yoichi Takahashi, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/928,496

(22) Filed: Jul. 14, 2020

(65) Prior Publication Data

US 2021/0021764 A1 Jan. 21, 2021

(30) Foreign Application Priority Data

Jul. 16, 2019 (JP) .............................. JP2019-131062

(51) Int. Cl.
*H04N 5/232* (2006.01)
*H04N 5/222* (2006.01)
*H04N 5/235* (2006.01)
*G06T 5/50* (2006.01)

(52) U.S. Cl.
CPC ......... *H04N 5/232125* (2018.08); *G06T 5/50* (2013.01); *H04N 5/2226* (2013.01); *H04N 5/2351* (2013.01)

(58) Field of Classification Search
None
See application file for complete search history.

(56) References Cited

U.S. PATENT DOCUMENTS

| 5,091,742 | A | * | 2/1992 | Fukahori | G02B 7/36 396/123 |
|---|---|---|---|---|---|
| 2009/0015681 | A1 | * | 1/2009 | Pipkorn | H04N 5/23218 348/208.12 |
| 2010/0208944 | A1 | * | 8/2010 | Fukunishi | H04N 5/23229 382/107 |
| 2012/0197079 | A1 | * | 8/2012 | Kuriyama | A61B 1/045 600/109 |
| 2018/0286020 | A1 | * | 10/2018 | Kawai | H04N 5/23229 |
| 2020/0026031 | A1 | * | 1/2020 | Li | G01S 17/86 |

FOREIGN PATENT DOCUMENTS

JP 10-290389 A 10/1998

* cited by examiner

*Primary Examiner* — Quan Pham
(74) *Attorney, Agent, or Firm* — Canon U.S.A., Inc. IP Division

(57) ABSTRACT

An apparatus includes a sensor, at least one memory, and at least one processor in communication with the at least one memory. The sensor is configured to pick up a plurality of images of an object, wherein the plurality of images is overlapped in at least a part of field angle and different in focal position. The at least one memory is configured to store instructions. The at least one processor is configured to execute the instructions to acquire distance information on the object and acquire difference of distances based on the distance information, set an aperture value based on the difference of distances, and combine the plurality of images. The sensor picks up the plurality of images at the set aperture value.

19 Claims, 7 Drawing Sheets

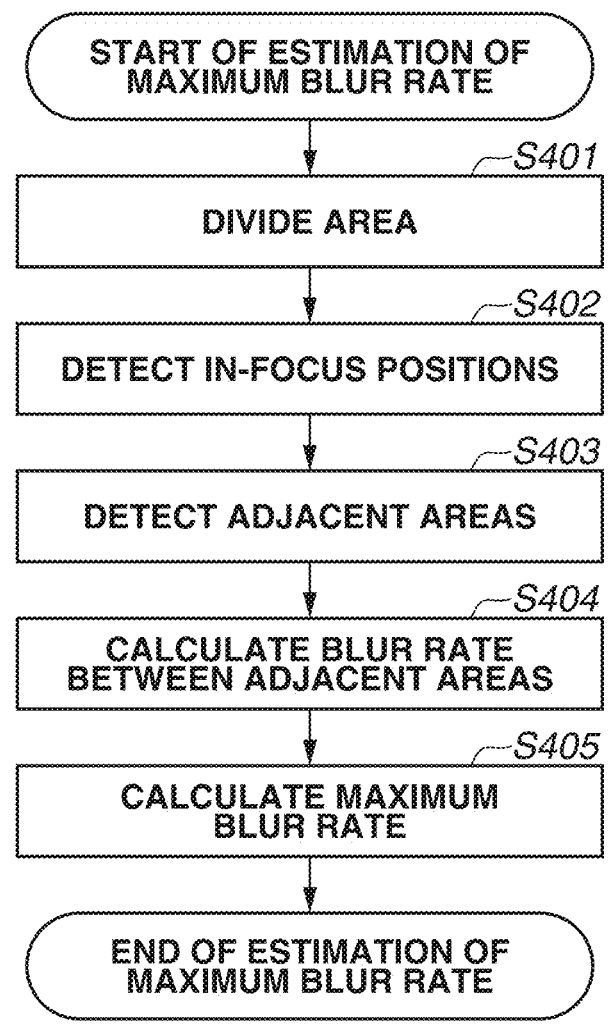

APPARATUS, METHOD, AND RECORDING MEDIUM

BACKGROUND OF THE INVENTION

Field of the Invention

The aspect of the embodiments relates to an apparatus that picks up a plurality of images different in focal position.

Description of the Related Art

In a case where an image processing apparatus, such as a digital camera, picks up an image including a plurality of objects that is largely different from one another in a distance from the image processing apparatus or picks up an image of an object long in a depth direction, only a part of the object is in focus due to an insufficient depth of field in some cases. To solve such an issue, Japanese Patent Application Laid-Open No. 10-290389 discusses a focus stacking technique. In the focus stacking technique, a plurality of images that is different in focal position and overlapped in field angle is picked up, and only in-focus areas are extracted from the respective images and combined into a single image in which an imaging area is entirely in focus.

However, when images picked up with a shallow depth of field are combined using the technique discussed in Japanese Patent Application Laid-Open No. 10-290389 in order to obtain a combined image with a high sense of resolution, the following issue can occur. In a case where the objects are present on a far side and a near side thereof and the object on the far side is brought into focus, if blur of the object on the near side is overlapped on the image of the object on the far side, the overlapping part of the object on the far side and the object on the near side becomes unclear in the combined image.

SUMMARY OF THE INVENTION

The aspect of the embodiments is directed to an apparatus including a sensor configured to pick up a plurality of images of an object, the plurality of images being overlapped in at least a part of field angle and different in focal position; at least one memory configured to store instructions; at least one processor in communication with the at least one memory and configured to execute the instructions to: acquire distance information of the object and acquire difference of distances based on the distance information; set an aperture value based on the difference of distances; and combine the plurality of images, wherein the sensor picks up the plurality of images at the set aperture value.

Further features of the disclosure will become apparent from the following description of exemplary embodiments with reference to the attached drawings.

BRIEF DESCRIPTION OF THE DRAWINGS

FIG. 4 is a flowchart illustrating estimation of a maximum blur rate according to the exemplary embodiment of the disclosure.

DESCRIPTION OF THE EMBODIMENTS

Figure 1:
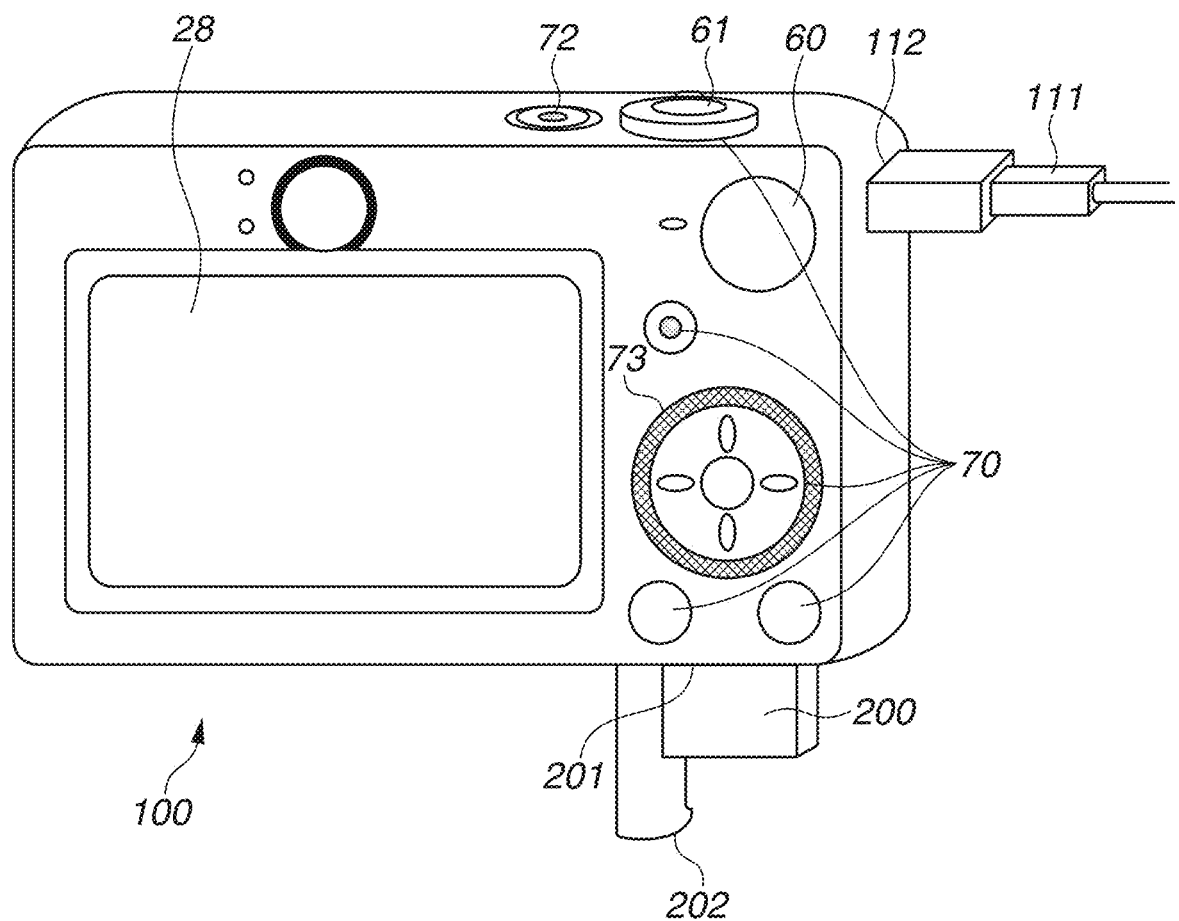
FIG. 1 is an appearance diagram of a digital camera as an example of an image pickup apparatus according to an exemplary embodiment of the disclosure.

A first exemplary embodiment swill be described below. FIG. 1 is an appearance diagram of a digital camera as an example of an image pickup apparatus according to the present exemplary embodiment. A display unit 28 displays an image and various kinds of information. A shutter button 61 is an operation portion for instructing image capturing. A mode selection switch 60 is an operation portion for selecting one of various kinds of modes. A connector 112 is a connecter between a connection cable 111 and a digital camera 100. An operation unit 70 includes operation members such as various kinds of switches, buttons, and a touch panel for receiving various kinds of operation from a user. A controller wheel 73 is a rotationally-operable operation member included in the operation unit 70. A power switch 72 is a portion for switching power on and off. A recording medium 200 is a recording medium such as a memory card and a hard disk. A recording medium slot 201 is a slot for storing the recording medium 200. The recording medium 200 stored in the recording medium slot 201 can communicate with the digital camera 100. A lid 202 is a lid of the recording medium slot 201.

Figure 2:
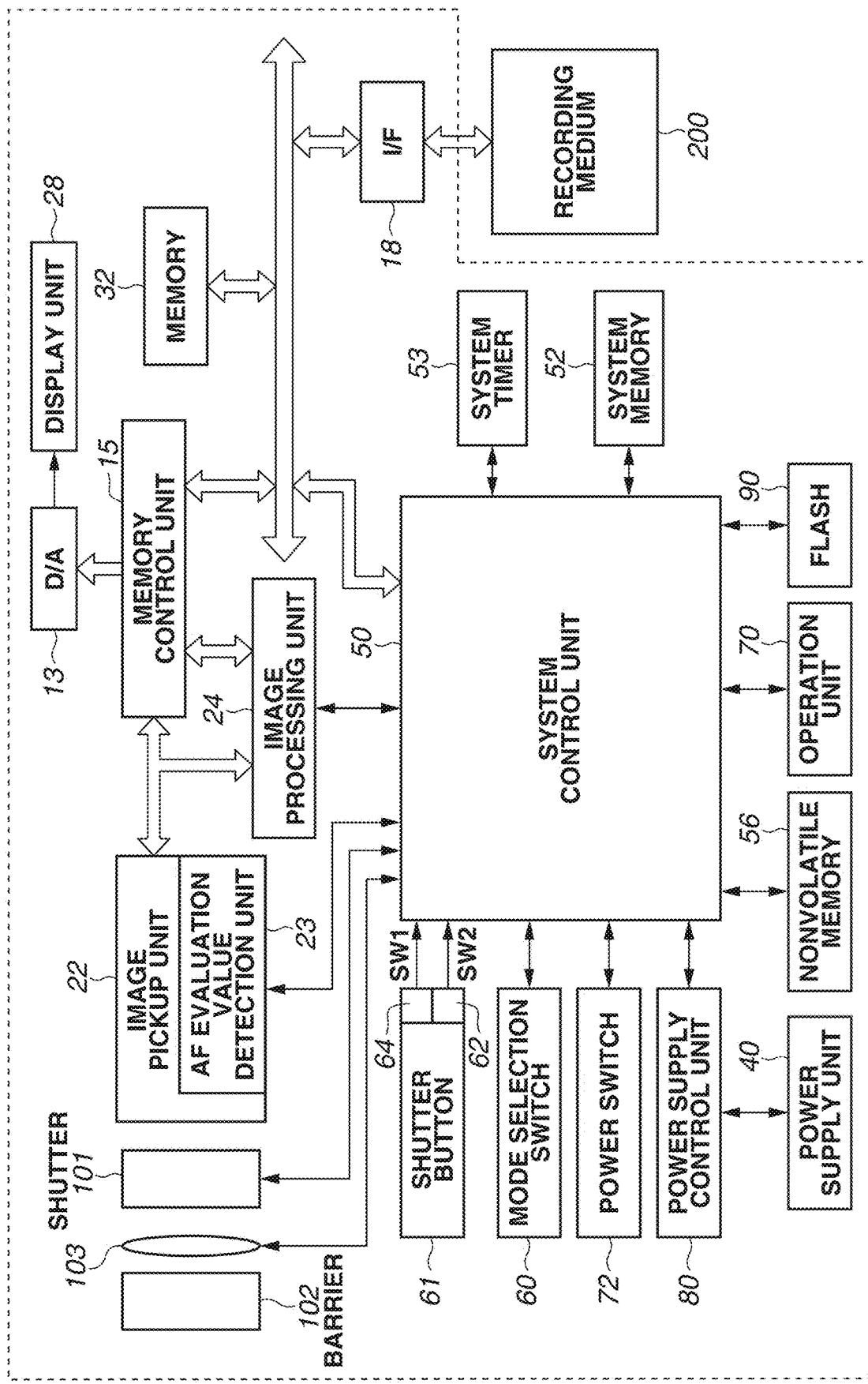
FIG. 2 is a block diagram illustrating a configuration example of the digital camera according to the exemplary embodiment of the disclosure.

FIG. 2 is a block diagram illustrating a configuration example of the digital camera according to the present exemplary embodiment.

In FIG. 2, an image pickup lens 103 is a lens group including a zoom lens and a focus lens. A shutter 101 has an aperture function. An image pickup unit 22 is an image pickup device including a charge-coupled device (CCD) sensor, a complementary metal-oxide semiconductor (CMOS) sensor, or the like that converts an optical image into an electric signal. In the image pickup device, each of pixels two-dimensionally arranged has a plurality of photoelectric conversion areas, and a plurality of parallax images different in view point can be acquired from outputs of a set of photoelectric conversion areas located at the same position among the pixels. Each of the plurality of parallax images is obtained by adding outputs from the plurality of photoelectric conversion areas in each of the pixels as a picked-up image that can be acquired by a normal image pickup device in which each of the pixels has a single photoelectric conversion area. In the present exemplary embodiment, each of the pixels includes two independent photoelectric conversion areas (photodiodes) A and B. The output of the photoelectric conversion areas A and the output of the photoelectric conversion areas B are acquired as independent images, thereby acquiring two parallax images A and B. A normal picked-up image can be acquired by adding the outputs of the photoelectric conversion areas A and B for each of the pixels. Although an example in which the plurality of parallax images are added and combined by an image processing unit 24 (described below) to acquire a picked-up image is described here, the picked-up image may be acquired by the image pickup unit 22 by adding and combining the plurality of parallax images. As described above, the parallax images A and B and the picked-up image can be acquired by a single imaging (exposure) operation. In the description of the present exemplary embodiment, the case where the two parallax images are acquired at the same time is described; however, a larger number of parallax images may be acquired by a larger number of pixels (e.g., 3×3 pixels) receiving optical fluxes entering near an image pickup plane. The image pickup unit 22 has an analog-to-digital (A/D) conversion processing function. An autofocus (AF) evaluation value detection unit 23 calculates an AF evaluation value based on contrast information obtained from a digital image signal and a phase difference obtained from the parallax images, and outputs the obtained AF evaluation value from the image pickup unit 22 to a system control unit 50. A barrier 102 covers an image pickup system including the image pickup lens 103 of the digital camera to prevent stain and damage in the image pickup system including the image pickup lens 103, the shutter 101, and the image pickup unit 22. A flash 90 emits light at the time of picking up an image to increase illuminance in a low-illuminance condition and a backlight condition.

An image processing unit 24 performs predetermined pixel interpolation, resize processing such as reduction, and color conversion processing on image data output from the image pickup unit 22 or image data from a memory control unit 15.

The image processing unit 24 can further acquire distance information of an object. The image processing unit 24 can acquire the distance to the object by detecting a phase difference from the two input parallax images, thereby acquiring the distance information from the image pickup unit 22 to the object for each pixel. In this example, the distance to the object is acquired based on the phase difference between the two parallax images. Alternatively, the distance to the object may be acquired with use of a contrast value for each block as an evaluation value based on images captured by the image pickup unit 2 while driving the image pickup lens 103.

Further, the image processing unit 24 performs predetermined calculation processing using the picked-up image data, and the system control unit 50 performs exposure control and ranging control based on the obtained calculation result. As a result, through-the-lens (TTL) automatic exposure (AE) processing and electronic flash pre-emission (EF) processing are performed. The image processing unit 24 also performs auto-focus (AF) processing. At this time, output of the AF evaluation value detection unit 23 in the image pickup unit 22 is used in some cases. The image processing unit 24 further performs predetermined calculation processing using the picked-up image data, and performs TTL automatic white balance (AWB) processing based on the obtained calculation result.

An object area dividing function will be described. The system control unit 50 transmits image data to the image processing unit 24. Under the control of the system control unit 50, the image processing unit 24 divides the object area based on a feature amount in the image, e.g., by grouping adjacent pixels having similar color information based on color information, and stores the divided areas in the memory 32. Although the example in which the area is divided based on color information has been described here, the area may be divided using luminance information as additional information.

As described above, image data to be displayed as live view or reproduced and displayed is analyzed to extract the feature amount of the image data, and the object area can be divided based on the feature amount. In the present exemplary embodiment, the object area is divided based on the color information in the image. Alternatively, the area may be divided using edge information and distance information in the image.

The output data of the image pickup unit 22 is directly written in the memory 32 via the image processing unit 24 and the memory control unit 15, or via the memory control unit 15. The memory 32 stores the image data that has been acquired and subjected to the A/D conversion by the image pickup unit 22, and the image data to be displayed on the display unit 28. The memory 32 has a storage capacity sufficient to store a predetermined number of still images, and a moving image and sound of a predetermined time period.

Further, the memory 32 also functions as an image display memory (video memory). A digital-to-analog (D/A) converter 13 converts the image display data stored in the memory 32 into an analog signal, and supplies the analog signal to the display unit 28. The display image data stored in the memory 32 is thus displayed on the display unit 28 via the D/A converter 13. The display unit 28 performs display corresponding to the analog signal from the D/A converter 13, on a display such as a liquid crystal display (LCD). The digital signal that has been A/D-converted by the image pickup unit 22 once and accumulated in the memory 32 is converted into the analog signal by the D/A converter 13, and the analog signal is consecutively transferred to and displayed on the display unit 28. As a result, the display unit 28 functions as an electronic view finder and performs live image display.

A nonvolatile memory 56 is an electrically erasable/recordable memory, and for example, a flash memory is used. The nonvolatile memory 56 stores constants for operation of the system control unit 50, programs, etc. The programs used herein indicate programs to execute various kinds of flowcharts described below in the present exemplary embodiment.

The system control unit 50 controls the entire digital camera 100. The system control unit 50 executes the programs recorded in the above-described nonvolatile memory 56 to realize processing according to the present exemplary embodiment to be described below. As a system memory 52, a random access memory (RAM) is used. The constants and variables for operation of the system control unit 50, the programs read out from the nonvolatile memory 56, etc. are developed to the system memory 52. Further, the system control unit 50 also controls the memory 32, the D/A converter 13, the display unit 28 to perform display control.

A system timer 53 is a time measurement unit that measures a time used for various kinds of control and measures a time of a built-in clock.

The mode selection switch 60, a first shutter switch 64, a second shutter switch 62, and the operation unit 70 are operation units for inputting various kinds of operation instructions to the system control unit 50.

The mode selection switch 60 switches an operation mode of the system control unit 50 to one of a still image recording mode, a moving image recording mode, a reproduction mode. The still image recording mode includes an automatic image pickup mode, an automatic scene determination mode, a manual mode, various kinds of scene modes based on image pickup settings of respective scenes, a program AE mode, and a custom mode. The mode is directly switched to any of these modes included in the still image pickup mode by the mode selection switch 60. Alternatively, the mode is once switched to the still image pickup mode by the mode selection switch 60, and then the mode may be switched to any of these modes included in the still image pickup mode by another operation unit. Likewise, the moving image pickup mode may also include a plurality of modes. The first shutter switch 64 is turned on in the middle of operation by half-depression (image pickup preparation instruction) of the shutter button 61 provided on the digital camera 100, and generates a first shutter switch signal SW1. The system control unit 50 starts operation of the AF processing, the AE processing, the AWB processing, the EF processing, etc. in response to the first shutter switch signal SW1.

A second shutter switch 62 is turned on at completion of operation that is so-called full-depression (image pickup instruction) of the shutter button 61, and generates a second shutter switch signal SW2. The system control unit 50 starts operation of a series of image pickup processing from reading of the signal from the image pickup unit 22 to writing of the image data in the recording medium 200, in response to the second shutter switch signal SW2.

The operation members of the operation unit 70 are appropriately assigned with functions for respective scenes by selectively operating various kinds of function icons displayed on the display unit 28, and act as various kinds of function buttons. Examples of the function buttons include an end button, a return button, an image feeding button, a jump button, a narrowing-down button, and an attribute change button. For example, when the menu button is pressed, a menu screen where various kinds of setting are performable is displayed on the display unit 28. A user can intuitively perform various kinds of setting by using the menu screen displayed on the display unit 28, a four-direction (up, down, right, and left) button, and a SET button.

The controller wheel 73 is a rotationally-operable operation member included in the operation unit 70, and is used together with the four-direction button to instruct a selection item or the like. When the controller wheel 73 is rotated, an electric pulse signal corresponding to an operation amount is generated. The system control unit 50 controls each of the units of the digital camera 100 based on the pulse signal. A rotation angle at which the controller wheel 73 has been operated, and the number of times of rotation of the controller wheel 73 can be determined from the pulse signal. The controller wheel 73 may be any operation member as long as the rotational operation thereof is detectable. For example, the controller wheel 73 may be a dial operation member that rotates and generates the pulse signal in response to rotational operation by the user. Further, the controller wheel 73 may be an operation member including a touch sensor (i.e., touch wheel) that detects rotational operation, etc. by a finger of the user on the controller wheel 73 without rotating.

A power supply control unit 80 includes a battery detection circuit, a direct current (DC)-DC converter, and a switch circuit switching a block to be energized, and detects presence/absence of an attached battery, a type of the battery, and a remaining battery level. Further, the power supply control unit 80 controls the DC-DC converter based on the detection results and an instruction from the system control unit 50, and supplies a voltage to the units including the recording medium 200 for a period.

A power supply unit 40 includes a primary battery such as an alkaline battery and a lithium battery, a secondary battery such as a nickel-cadmium (NiCd) battery, a nickel metal hydride (NiMH) battery, and a lithium (Li) battery, or an alternating-current (AC) adapter. A recording medium interface (I/F) 18 is an interface with the recording medium 200 such as a memory card and a hard disk. The recording medium 200 is a recording medium such as a memory card for recording a picked-up image, and includes a semiconductor memory or a magnetic disk. The above-described digital camera 100 can pick up an image with use of center single point AF or face AF. The center single point AF is AF performed on a single point at the central position in an image pickup screen. The face AF is AF performed on a face in the image pickup screen detected by a face detection function. In addition, the AF can be performed on a main object by detecting the main object in the image pickup screen.

Figure 3:
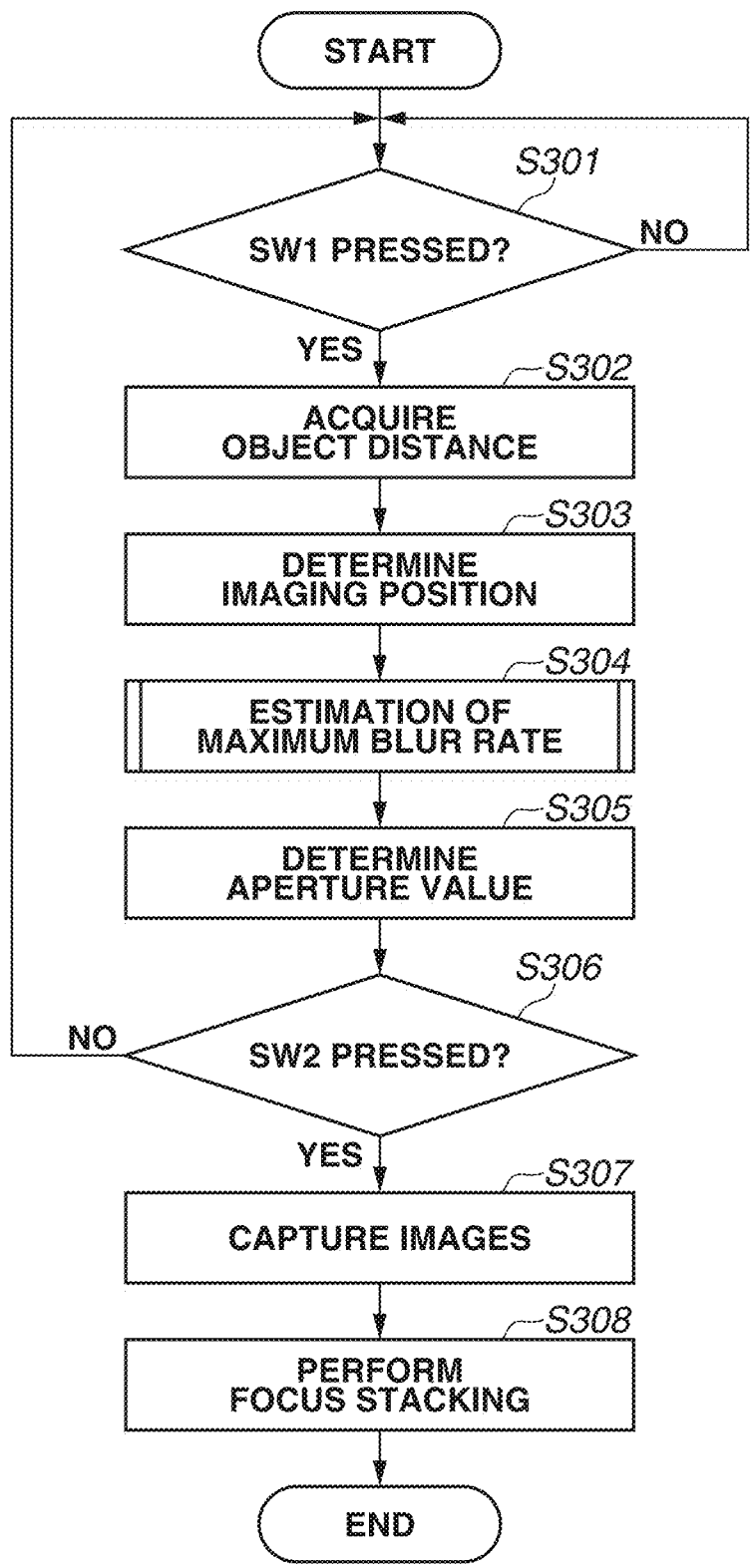
FIG. 3 is a flowchart illustrating focus stacking according to the exemplary embodiment of the disclosure.

FIG. 3 is a flowchart illustrating focus stacking according to the present exemplary embodiment.

In step S301, when the switch SW1 is pressed (YES in step S301), the processing proceeds to step S302.

In step S302, the image processing unit 24 acquires distance information of each of the pixels under the control of the system control unit 50, using the parallax information acquired from the image pickup unit 22. In a case where the image pickup unit 22 from which the parallax information cannot be directly acquired is provided, the distance information may be obtained by an existing method in which a plurality of images is picked up while a focal position is changed, and contrast values of pixels at the same position among the picked-up images are compared.

In step S303, the system control unit 50 sets a focal position (image pickup position) for picking up a plurality of images to be combined. For example, the system control unit 50 sets the image pickup position such that a range from the nearest side to the object to the infinite side is within the depth of field of the combined image, based on the distance information acquired in step S302. Alternatively, the user designates both ends of the image pickup position using the touch panel provided in the operation unit 70 or the like, and the system control unit 50 sets the entire image pickup position based on the designated ends of the image pickup position.

In step S304, the system control unit 50 estimates the maximum blur rate.

FIG. 4 is a flowchart illustrating estimation of the maximum blur rate according to the present exemplary embodiment.

In step S401, the system control unit 50 divides the area.

Figure 5A:
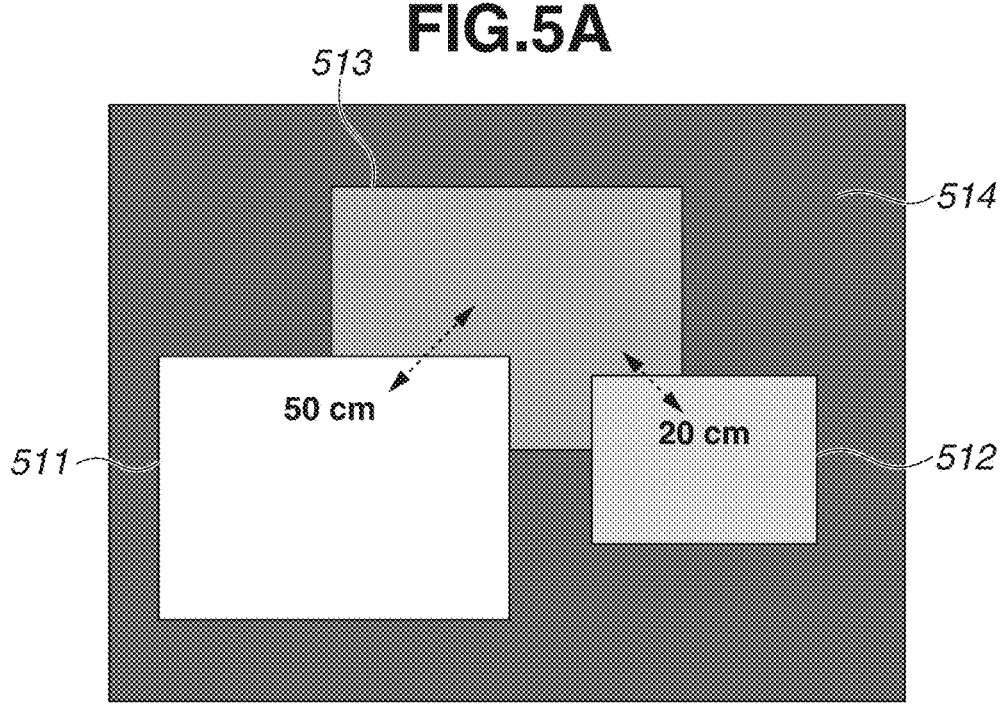
FIGS. 5A and 5B are diagrams illustrating area division according to the exemplary embodiment of the disclosure.
Figure 5B:
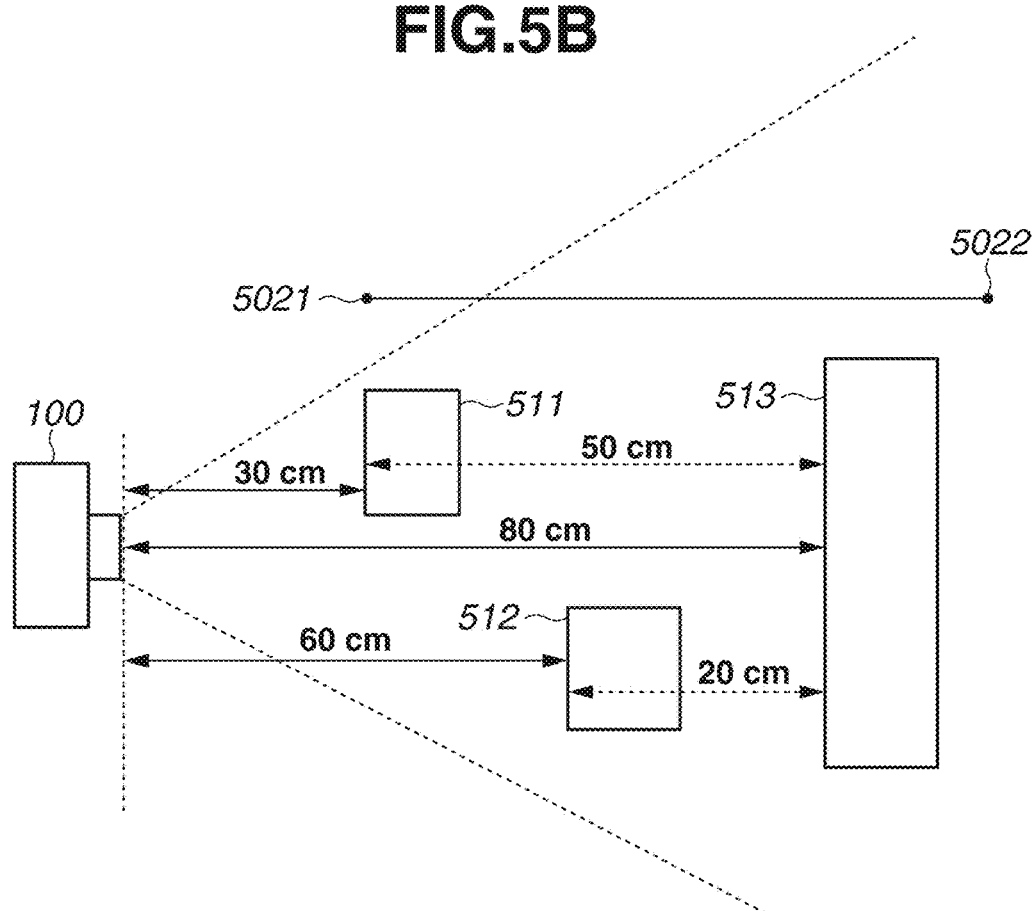

FIGS. 5A and 5B are diagrams illustrating the area division according to the present exemplary embodiment. FIG. 5A illustrates a state of the area division viewed from a side of the digital camera 100. In FIG. 5A, areas 511 to 513 and a background 514 are illustrated. FIG. 5B is a diagram illustrating a state of the image pickup in FIG. 5A viewed from a side. In FIG. 5B, distances in an optical axis direction of the areas 511 to 513 of the object picked-up by the digital camera 100 and the background 514 are illustrated.

In the following, the estimation of the maximum blur rate is described with reference to FIG. 4.

In step S401, the image processing unit 24 divides the area. The area can be divided based on, for example, the distance information acquired by the image processing unit 24 in step S302. More specifically, the area is divided by groups each of which has areas having similar distance information. For example, in the case illustrated in FIG. 5A, although a surface of the object is slightly uneven, the distance information over the entire area 511 is regarded to be substantially equivalent. Accordingly, the image processing unit 24 recognizes the area 511 as one group. Likewise, the image processing unit 24 recognizes each of the area 512 and the area 513 as one group. Finally, the image processing unit 24 recognizes the background 514 having the distance information close to infinite distance, as background. The areas 511 to 513 can be divided from the image illustrated in FIG. 5A by the above-described processing.

Other than the area dividing method based on distance information, the image processing unit 24 can divide the area with use of color information or luminance information on the object.

In step S402, the image processing unit 24 acquires in-focus positions of the areas present in an image pickup range from points 5021 to 5022. For example, in the scene illustrated in FIG. 5B, the image processing unit 24 acquires the in-focus positions of the respective areas 511 to 513 based on the distance information acquired in step S302. In the case illustrated in FIG. 5B, the in-focus positions of the areas 511 to 513 are respectively 30 cm, 60 cm, and 80 cm from the digital camera 100.

In step S403, the image processing unit 24 detects adjacent areas. For example, in the scene illustrated in FIG. 5A, the image processing unit 24 detects, as the adjacent areas, the areas 511 and 513 overlapping each other, and the areas 512 and 513 overlapping each other.

In step S404, the image processing unit 24 calculates the blur rate between the adjacent areas. The blur rate can be acquired from difference of the pieces of distance information on the object areas.

Figure 6:
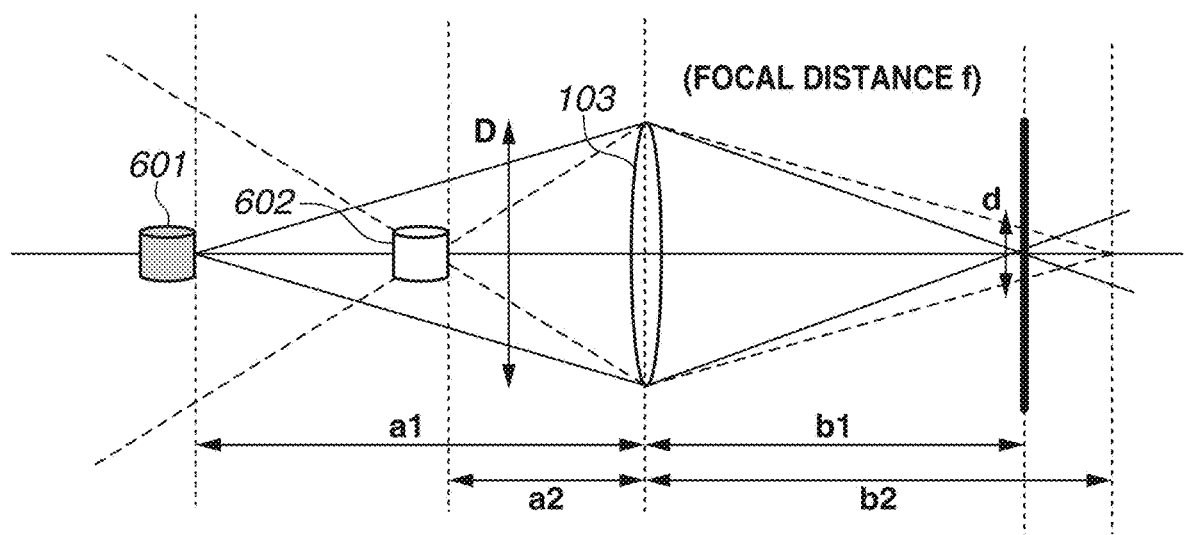
FIG. 6 is a diagram illustrating calculation of a blur rate according to the exemplary embodiment of the disclosure.

A specific method of calculating the blur rate will be described. FIG. 6 is a diagram illustrating calculation of the blue rate according to the present exemplary embodiment.

In FIG. 6, an object 601 and an object 602 are illustrated. The object 601 and the object 602 partially overlap each other as viewed from an optical axis direction. In other words, the area of the object 601 and the area of the object 602 correspond to the above-described adjacent areas. A distance between the object 601 and the image pickup lens 103 is a1, and a distance between the object 602 and the image pickup lens 103 is a2. When a focal distance of the image pickup lens 103 is f, an image distance b1 of the object 601 and an image distance b2 of the object 602 can be determined by the following equations (1) and (2):

$$b_1 = \frac{fa_1}{a_1 - f}, \text{ and} \qquad (1)$$

$$b_2 = \frac{fa_2}{a_2 - f}. \qquad (2)$$

Since the area of the object 601 and the area of the object 602 correspond to the above-described adjacent areas, the blur rate can be calculated by the following equation (3):

$$BLR_r = \frac{b_2 - b_1}{b_2}. \qquad (3)$$

In the equation (3), BLRr is the maximum blur rate. The following equation (4) can be obtained by simultaneously setting up the equations (1), (2), and (3).

$$BLR_r = \frac{f(a_1 - a_2)}{a_2(a_1 - f)} \qquad (4)$$

The image processing unit 24 performs the above-described calculation on all combinations of the adjacent areas (e.g., a combination of areas 511 and 513, and a combination of areas 512 and 513 in FIGS. 5A and 5B) to calculate several blur rates. In step S405, the image processing unit 24 determines the maximum one of the blur rates calculated in step S404, as the maximum blur rate.

Next, in step S305, the system control unit 50 determines an aperture value based on an allowable blur amount. The allowable blur rate used herein may be previously set based on property of a lens or the like, or may be set by the user.

First, a blur amount d on the image pickup unit 22 can be calculated by the following equation (5):

$$d = BLR_{rmax}D, \qquad (5)$$

where D is an effective aperture, and BLRrmax is the maximum blur rate estimated in step S304.

An aperture value F can be expressed by the following equation (6):

$$D = \frac{F}{f}. \qquad (6)$$

The minimum value of the aperture value F to reduce the blur amount to an allowable blur amount d' can be determined by the following equation (7) derived from simultaneous setup of the above-described equations (5) and (6), $$F = \frac{d'f}{BLR_r}. \qquad (7)$$

Figure 7:
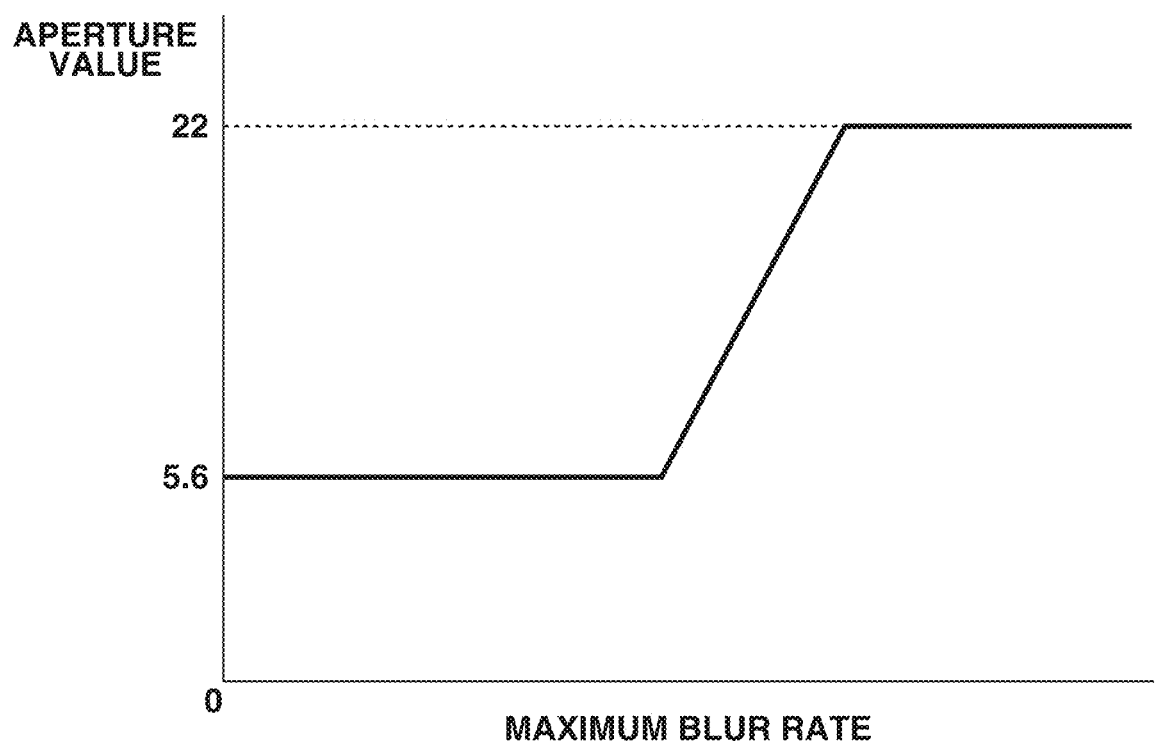
FIG. 7 is an exemplary graph illustrating relationship between an aperture value and a maximum blur rate according to the exemplary embodiment of the disclosure.

Alternatively, in one embodiment, the processing in step S305 may be performed in the following manner. In a case where the system control unit 50 automatically sets the aperture value, the aperture value that is previously held in the nonvolatile memory 56 and causes the highest resolution is used. However, in a case where the aperture value previously held in the nonvolatile memory 56 is smaller than the aperture value calculated in the equation (7), the aperture value calculated by the equation (7) is used. In a case where the user sets the aperture value in advance and the set aperture value is smaller than the aperture value calculated in the equation (7), the aperture value calculated in the equation (7) may be set after a warning is displayed on the display unit 28. In the present exemplary embodiment, the system control unit 50 determines the settable minimum value F from the maximum blur rate by using the equation (7); however, a determination table of the aperture value corresponding to the maximum blur rate may be held in the nonvolatile memory 56 beforehand, and the aperture value may be determined based on the table. FIG. 7 is an example of a graph illustrating relationship between the aperture value and the maximum blur rate according to the present exemplary embodiment. For example, the system control unit 50 may use the graph illustrated in FIG. 7 to calculate the aperture value from the maximum blur rate.

In step S307, the image pickup unit 22 picks up images at the image pickup position determined in step S303.

In step S308, the image processing unit 24 performs the focus stacking on the images picked-up in step S307.

An example of the focus stacking method will be described. First, the system control unit 50 calculates a positional displacement amount between the two images to be combined. An example of the calculation method of the positional displacement amount will be described below. First, the system control unit 50 sets a plurality of blocks in one of the images. In one embodiment, the system control unit 50 sets the blocks such that each block has the same size. Next, the system control unit 50 sets search ranges that are wider than the respective set blocks at the same positions in the other image. Finally, the system control unit 50 calculates, in each of the search ranges in the other image, a correspondence point at which a sum of absolute differences (hereinafter, referred to as SAD) in luminance with the corresponding first set block. The system control unit 50 calculates, as a vector, positional displacement between a center of each of the first set blocks and the above-described correspondence point of the corresponding search range. The system control unit 50 may use a sum of squared differences, normalized cross-correlation, or the like besides the SAD, in the calculation of the above-described correspondence point.

Next, the system control unit 50 calculates a transformation coefficient from the positional displacement amount. The system control unit 50 uses, for example, a projection transformation coefficient as the transformation coefficient. The transformation coefficient, however, is not limited only to the projection transformation coefficient, and an affine transformation coefficient or a simplified conversion coefficient for only horizontal/perpendicular shift may be also used.

For example, the system control unit 50 uses an equation (8) to perform transformation, $$I'\begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix}, \quad (8)$$

where (x', y') is a coordinate after the transformation, and (x, y) is a coordinate before the transformation.

Next, the image processing unit 24 calculates a contrast value of each of the aligned images. As an example of a method for calculating the contrast value, for example, the image processing unit 24 first calculates a luminance Y from color signals Sr, Sg, and Sb of each of the pixels by the following equation (9):

$$Y = 0.299 Sr + 0.587 Sg + 0.114 Sb. \quad (9)$$

Next, the image processing unit 24 calculates a contrast value I by applying a Sobel filter to a matrix L of the luminances Y of the 3×3 pixels as expressed by the following equations (10) to (12):

$$I_h = \begin{pmatrix} -1 & 0 & 1 \\ -2 & 0 & 2 \\ -1 & 0 & 1 \end{pmatrix} \cdot L, \quad (10)$$

$$I_v = \begin{pmatrix} -1 & -2 & -1 \\ 0 & 0 & 0 \\ 1 & 2 & 1 \end{pmatrix} \cdot L, \text{ and} \quad (11)$$

$$I = \sqrt{I_h^2 + I_v^2}. \quad (12)$$

The above-described method of calculating the contrast value is a mere example. For example, an edge detection filter such as a Laplacian filter or a band-pass filter that allows passage in a predetermined bandwidth may be used.

Next, the image processing unit 24 generates a combination map. To generate the combination map, the image processing unit 24 compares the contrast values of the pixels located at the same position among the images, sets a combination ratio of the pixel having the highest contrast value to 100%, and sets the combination ratios of the other pixels at the same position to 0%. The image processing unit 24 performs such setting of the combination ratio on all of the positions in the images.

Finally, the image processing unit 24 performs replacement of the pixels based on the combination map, and generates a combined image. In the combination ratios calculated in the above-described manner, when the combination ratio is changed from 0% to 100% (or from 100% to 0%) between the adjacent pixels, unnaturalness is prominent at the combination boundary. Therefore, a filter having a predetermined number of pixels (predetermined number of taps) is applied to the combination map to prevent the combination ratio from drastically changing between the adjacent pixels.

According to the present exemplary embodiment, the aperture value is set in consideration of the difference in distance between the adjacent areas, which makes it possible to prevent the overlap of blur on the in-focus areas.

Further, in the present exemplary embodiment, the calculation of the evaluation value is started at the same time when a first image is picked up, which makes it possible to accelerate the processing.

OTHER EXEMPLARY EMBODIMENTS

Although the exemplary embodiment has been described based on implementation in a digital camera, the implementation is not limited to the digital camera. For example, the above-described exemplary embodiment may be implemented in a mobile device incorporating an image pickup device, or a network camera that can pick up an image.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-131062, filed Jul. 16, 2019, which is hereby incorporated by reference herein in its entirety.

What is claimed is:

1. An apparatus, comprising:
a sensor configured to pick up a plurality of images of an object, the plurality of images being overlapped in at least a part of field angle and different in focal position;
at least one memory configured to store instructions;
at least one processor in communication with the at least one memory and configured to execute the instructions to:
acquire distance information of the object and acquire difference of distances based on the distance information;
acquire a blur amount based on the difference of distances;
set an aperture value based on the blur amount; and
combine the plurality of images,
wherein the sensor picks up the plurality of images at the set aperture value,
wherein the at least one processor further executes the instructions to set the aperture value based on a maximum blur rate, and
wherein the maximum blur rate is a maximum of a plurality of calculated blur rates.

2. The apparatus according to claim 1,
wherein the at least one processor further executes the instructions to generate a combined image by performing the combination, and
wherein a depth of field of the combined image is deeper than a depth of field of any of the plurality of images.

3. The apparatus according to claim 1, wherein the at least one processor further executes the instructions to designate the focal positions of the plurality of images.

4. The apparatus according to claim 1, wherein the at least one processor further executes the instructions to:
divide an image area of the object into areas; and
acquire the difference of distances based on the distance information of the divided areas.

5. The apparatus according to claim 4, wherein the at least one processor further executes the instructions to divide the image area of the object based on at least color information, luminance information, or the distance information.

6. The apparatus according to claim 1, wherein the at least one processor further executes the instructions to acquire difference of distance on adjacent areas in an image area of the object.

7. The apparatus according to claim 1, wherein the blur amount is an allowable blur amount.

8. A method, comprising:
picking up a plurality of images of an object, the plurality of images being overlapped in at least a part of field angle and different in focal position;
acquiring distance information of the object and acquiring difference of distances based on the distance information;
acquiring a blur amount based on the difference of distances;
setting an aperture value based on the blur amount; and
combining the plurality of images,
wherein the plurality of images is picked up at the set aperture value,
wherein the setting the aperture value further based on a maximum blur rate, and
wherein the maximum blur rate is a maximum of a plurality of calculated blur rates.

9. The method according to claim 8, further comprising generating a combined image by performing the combination,
wherein a depth of field of the combined image is deeper than a depth of field of any of the plurality of images.

10. The method according to claim 8, further comprising designating the focal positions of the plurality of images.

11. The method according to claim 8, further comprising:
dividing an image area of the object into areas; and
acquiring the difference of distances based on the distance information of the divided areas.

12. The method according to claim 11, further comprising dividing the image area of the object based on at least color information, luminance information, or the distance information.

13. The method according to claim 8, further comprising acquiring difference of distance on adjacent areas in an image area of the object.

14. A non-transitory computer readable recording medium, which stores a program for causing a computer of an apparatus to execute a method, the method comprising:
picking up a plurality of images of an object, the plurality of images being overlapped in at least a part of field angle and different in focal position;
acquiring distance information of the object and acquiring difference of distances based on the distance information;
acquiring a blur amount based on the difference of distances;
setting an aperture value based on the blur amount; and
combining the plurality of images,
wherein the plurality of images is picked up at the set aperture value,
wherein the setting the aperture value further based on a maximum blur rate, and
wherein the maximum blur rate is a maximum of a plurality of calculated blur rates.

15. The non-transitory computer readable recording medium according to claim 14, further comprising generating a combined image by performing the combination,
wherein a depth of field of the combined image is deeper than a depth of field of any of the plurality of images.

16. The non-transitory computer readable recording medium according to claim 14, further comprising designating the focal positions of the plurality of images.

17. The non-transitory computer readable recording medium according to claim 14, further comprising:
dividing an image area of the object into areas; and
acquiring the difference of distances based on the distance information of the divided areas.

18. The non-transitory computer readable recording medium according to claim 17, further comprising dividing the image area of the object based on at least color information, luminance information, or the distance information.

19. The non-transitory computer readable recording medium according to claim 14, further comprising acquiring difference of distance on adjacent areas in an image area of the object.

* * * * *